United States Patent
Chen et al.

(10) Patent No.: US 10,693,286 B2
(45) Date of Patent: Jun. 23, 2020

(54) WIRE FIXING DEVICE

(71) Applicant: Hold Well Industrial Co., Ltd., Taichung (TW)

(72) Inventors: Kuan-Ta Chen, Taichung (TW); Huei-Syuan Wang, Taichung (TW)

(73) Assignee: HOLD WELL INDUSTRIAL CO., LTD., Taichung (TW)

( * ) Notice: Subject to any disclaimer, the term of this patent is extended or adjusted under 35 U.S.C. 154(b) by 201 days.

(21) Appl. No.: 16/047,039

(22) Filed: Jul. 27, 2018

(65) Prior Publication Data

US 2020/0036173 A1 Jan. 30, 2020

(51) Int. Cl.
*H02G 3/04* (2006.01)
*H01B 7/00* (2006.01)

(52) U.S. Cl.
CPC ........... *H02G 3/045* (2013.01); *H01B 7/0045* (2013.01)

(58) Field of Classification Search
CPC ............................... H02G 3/045; H01B 7/0045
USPC ...................................................... 174/167
See application file for complete search history.

(56) References Cited

U.S. PATENT DOCUMENTS

| | | | | |
|---|---|---|---|---|
| 4,191,443 A | * | 3/1980 | Doyle | H01R 13/506 439/462 |
| 5,368,506 A | * | 11/1994 | Heimbrock | H01R 4/36 439/709 |
| 5,460,536 A | * | 10/1995 | Cullen | B23K 11/364 439/289 |
| 2009/0200076 A1 | * | 8/2009 | Reynolds | H01R 13/639 174/659 |

* cited by examiner

Primary Examiner — Dimary S Lopez Cruz
(74) Attorney, Agent, or Firm — Burris Law, PLLC (57) ABSTRACT

A wire fixing device adapted for gripping at least one wire in a machine includes a positioning seat having at least one first cavity, and a first gripping seat disposed at one side of the positioning seat. The first gripping seat includes a first body and at least one first gripping member. The first gripping member has a first connection end portion connected to the first body, a first terminal end portion being resilient and opposite to the first connection end portion and inserted into the first cavity, and a first through hole adapted for extension of the wire therethrough. The first terminal end portion is constricted by the first cavity to grip securely the wire.

15 Claims, 6 Drawing Sheets

WIRE FIXING DEVICE

FIELD

The disclosure relates to a fixing device, and more particularly to a wire fixing device for gripping and positioning at least one wire in a machine.

BACKGROUND

Modern machines (such as machine tool and robotic arm) improve upon their predecessors, notably conventional lathe, milling machines and mechanical arms, with multi-axial movement and multiple processing functions via computer numerical control (CNC) instead of manual control in a variety of industries. In order to do so, various electrical wires are required to be physically positioned in a head of the machine tool or in the robotic arm to electrically transmit the control signals, so as to meet a diversity of processing functions. However, if these wires are not securely positioned, the wires might be accidently pulled apart due to translational or rotational motion of the machine tool or robotic arm, which might cause unintended electrical disconnection of components thereof, thereby greatly increasing the maintenance costs.

SUMMARY

Therefore, an object of the disclosure is to provide a wire fixing device that can alleviate at least one of the drawbacks of the prior art.

According to the disclosure, the wire fixing device is adapted for gripping and positioning at least one wire in a machine, and includes:
a positioning seat having a first end surface, a second end surface that is opposite to the first end surface in a first direction, and at least one first cavity that extends from the first end surface in the first direction toward the second end surface; and
a first gripping seat disposed at one side of the positioning seat, and including
a first body that has a first inner surface facing the first end surface of the positioning seat, and
at least one first gripping member that has
a first connection end portion connected to the first inner surface of the first body,
a first terminal end portion being resilient and opposite to the first connection end portion in the first direction, and inserted into the at least one first cavity, and
a first through hole extending from the first connection end portion to the first terminal end portion, and adapted for extension of the at least one wire therethrough, the first terminal end portion being constricted by the at least one first cavity to grip securely the at least one wire.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
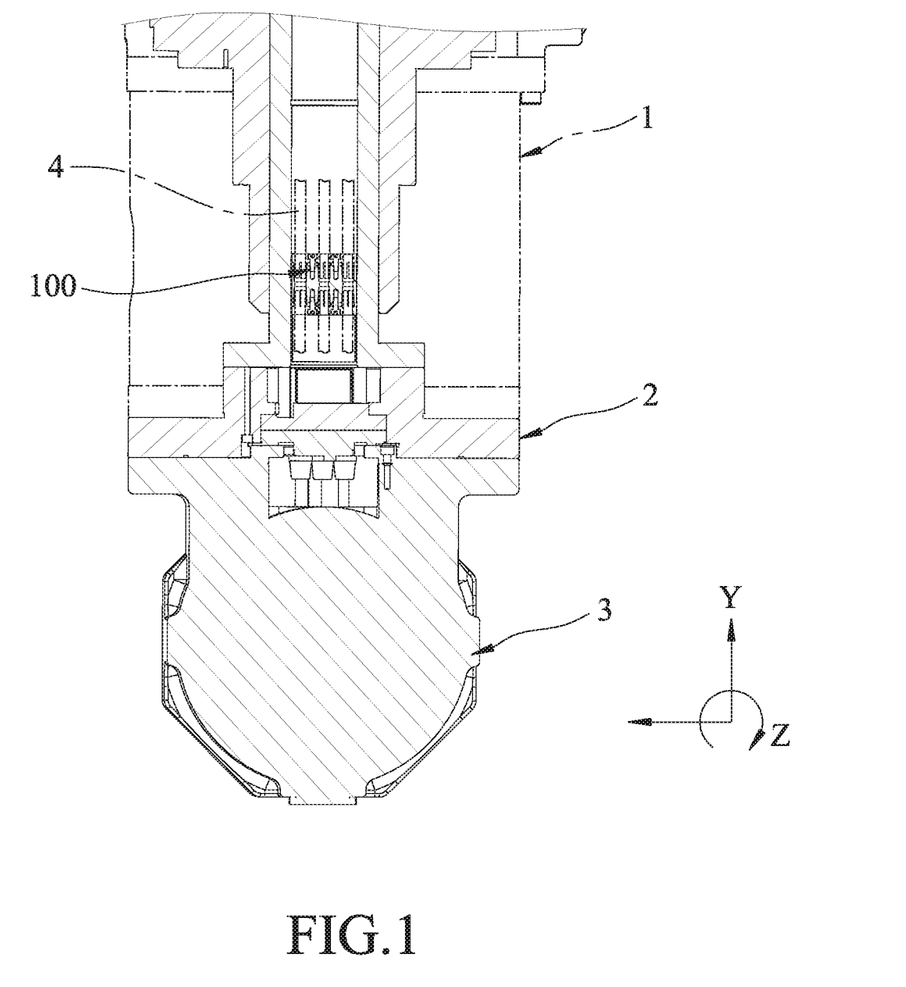
FIG. 1 is a schematic view illustrating an embodiment of a wire fixing device according to the disclosure mounted in a head of a machine tool.
Figure 2:
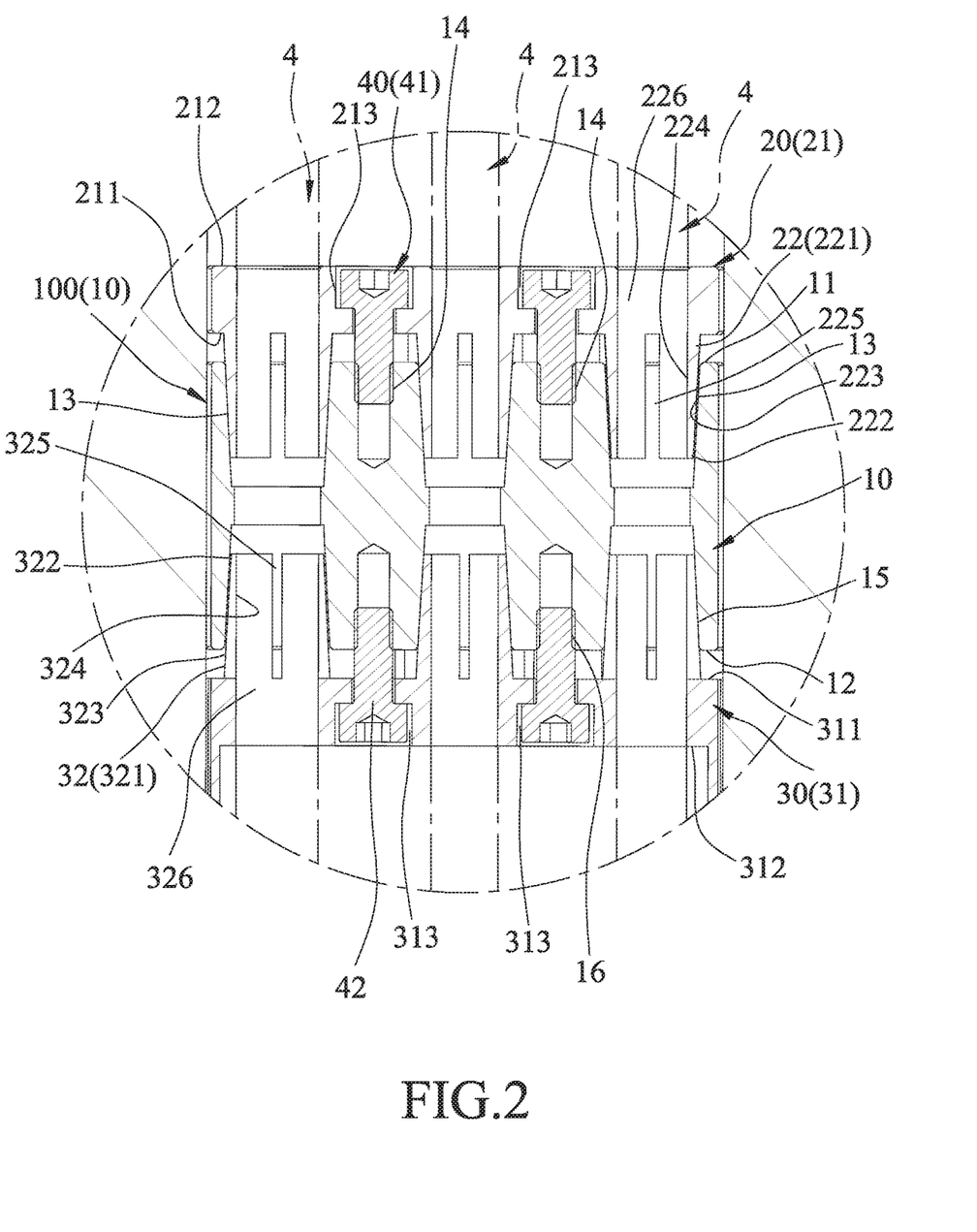
FIG. 2 is a fragmentary enlarged, sectional view of FIG. 1 illustrating connection among a positioning seat, a first gripping seat and a second gripping seat of the embodiment.
Figure 3:
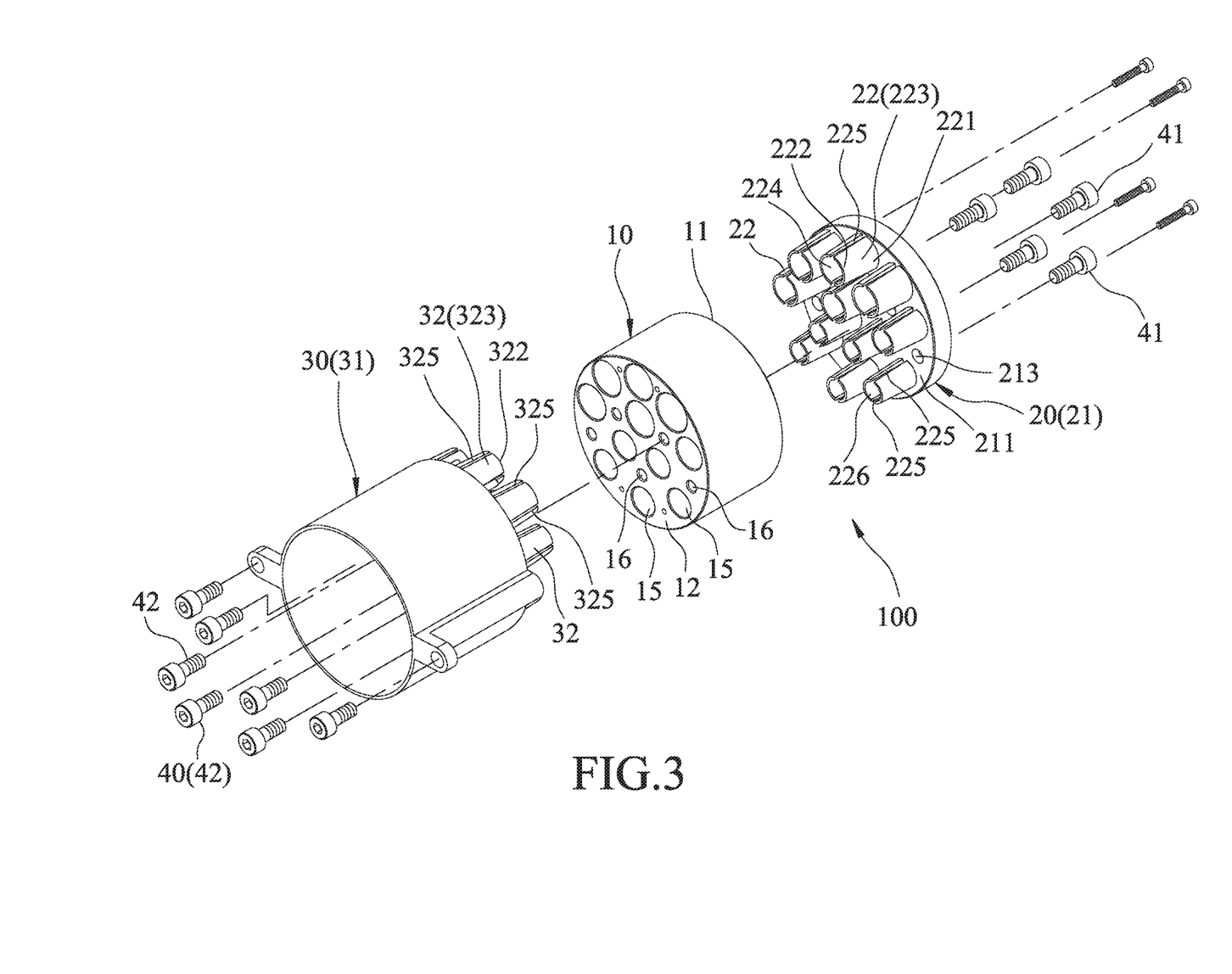
FIG. 3 is an exploded perspective view of the embodiment.

Referring to FIGS. 1 to 3, the embodiment of a wire fixing device 100 according to this disclosure is suitable for gripping and positioning at least one wire 4 in a head of a machine tool. The head of the machine tool includes a seat unit 1, a first rotary unit 2 that is mounted in the seat unit 1 and that is rotatable about Y axis relative to the seat unit 1, and a second rotary unit 3 that is connected to the first rotary unit 2 and that is rotatable about Z axis.

The wire fixing device 100 includes a positioning seat 10, a first gripping seat 20, a second gripping seat 30 and a fastening unit 40.

The positioning seat 10 has a first end surface 11, a second end surface 12 opposite to the first end surface 11 in a first direction, at least one first cavity 13, at least one first threaded hole 14 extending inwardly from the first end surface 11, at least one second cavity 15, and at least one second threaded hole 16 extending inwardly from the second end surface 12. In this embodiment, the positioning seat 10 has a plurality of the first cavities 13, a plurality of the first threaded holes 14, a plurality of the second cavities 15, and a plurality of the second threaded holes 16 (see FIGS. 2 and 3).

Each of the first cavities 13 is opened at the first end surface 11 and extends from the first end surface 11 in the first direction toward the second end surface 12. Similarly, each of the second cavities 15 is opened at the second end surface 12 and extends from the second end surface 12 toward the first end surface 11 in a second direction that is opposite to the first direction. In this embodiment, each of the second cavities 15 is spatially connected to a respective one of the first cavities 13. Each of the first cavities 13 is frustoconical and has a diameter decreasing from the first end surface 11 toward the second end surface 12. Likewise, each of the second cavities 15 is frustoconical and has a diameter decreasing from the second end surface 12 toward the first end surface 11.

The first gripping seat 20, which is disposed at one side of the positioning seat 10, includes a first body 21 and at least one first gripping member 22. The first body 21 has a first inner surface 211 facing the first end surface 11 of the positioning seat 10, a first outer surface 212 opposite to the first inner surface 211, and a plurality of first locking holes 213 extending from the first outer surface 212 to the first inner surface 211 and respectively registered with the first threaded holes 14.

In this embodiment, the first gripping seat 20 includes a plurality of the first gripping members 22. Each of the first gripping members 22 has a first connection end portion 221, a first terminal end portion 222, a first outer surface 223, a first inner surface 224, two first slots 225 and a first through hole 226.

The first connection end portion 221 is connected to the first inner surface 211 of the first body 21. The first terminal end portion 222 is resilient and is opposite to the first connection end portion 221 in the first direction. The first terminal end portion 222 of each of the first gripping members 22 is inserted into a respective one of the first cavities 13. As such, the first terminal end portion 222 is constricted by the respective one of the first cavities 13 to grip securely the at least one wire 4.

The first through hole 226 extends from the first connection end portion 221 to the first terminal end portion 222, and is adapted for extension of the at least one wire 4 therethrough.

The first outer surface 223 extends from the first connection end portion 221 to the first terminal end portion 222. The first inner surface 224 is opposite to the first outer surface 223 and faces and defines the first through hole 226. In this embodiment, the first outer surface 223 is frustoconical and has a diameter decreasing from the first connection end portion 221 toward the first terminal end portion 222.

The two first slots 225 extend from the first terminal end portion 222 toward the first connection end portion 221. The two first slots 225 pass through the first outer surface 223 and the first inner surface 224, and is in spatial communication with the first through hole 226. The two first slots 225 of each of the first gripping members 22 are angularly spaced apart by 180 degrees.

It should be noted that the shape of the first outer surface 223 and the amount and arrangement of the first slots 225 are not limited thereto, and may vary to meet actual requirements. For example, each of the first outer surfaces 223 may be in the shape of a polygonal column, as long as the first terminal end portions 222 could be inserted into and be constricted by the respective one of the first cavities 13 to grip securely the at least one wire 4. In addition, each of the first gripping members 22 may have only one first slot 225 or more than two first slots 225. In the case that a plurality of the first slots 225 are formed and are equally and angularly spaced apart from each other, the stress generated by the constriction of the first gripping members 22 could be effectively dispersed. However, if the first gripping member 22 is made of a resilient material, the first slots 225 may be omitted.

The second gripping seat 30, which is disposed at one side of the positioning seat 11 opposite to the first gripping seat 20, includes a second body 31 and at least one second gripping member 32. The second body 31 has a second inner surface 311 facing the second end surface 12 of the positioning seat 10, a second outer surface 312 opposite to the second inner surface 311, and a plurality of second locking holes 313. The second locking holes 313 extend from the second outer surface 312 to the second inner surface 311 and respectively registered with the second threaded holes 16.

In this embodiment, the second gripping seat 30 includes a plurality of the second gripping members 32. Each of the second gripping members 32 has a second connection end portion 321, a second terminal end portion 322, a second outer surface 323, a second inner surface 324, four second slots 325 and a second through hole 326.

The second connection end portion 321 is connected to the second inner surface 311 of the second body 31. The second terminal end portion 322 is resilient and is opposite to the second connection end portion 321 in the second direction. The second terminal end portion 322 of each of the second gripping members 32 is inserted into a respective one of the second cavities 15. As such, the second terminal end portion 322 is constricted by the respective one of the second cavities 15 to grip securely the at least one wire 4.

The second through hole 326 extends from the second connection end portion 321 to the second terminal end portion 322, and is adapted for extension of the at least one wire 4 therethrough.

The second outer surface 323 extends from the second connection end portion 321 to the second terminal end portion 322. The second inner surface 324 is opposite to the second outer surface 323 and faces and defines the second through hole 326. In this embodiment, the second outer surface 323 is frustoconical and has a diameter decreasing from the second connection end portion 321 toward the second terminal end portion 322.

The four second slots 325 extend from the second terminal end portion 322 toward the second connection end portion 321. The four second slots 325 pass through the second outer surface 323 and the second inner surface 324, and are in spatial communication with the second through hole 326. These second slots 325 of each of the second gripping members 32 are angularly spaced apart by 90 degrees.

It should be noted that, the shape of the second outer surface 323 and the amount and arrangement of the second slots 325 are not limited thereto and may vary to meet actual requirements. For example, each of the second outer surfaces 323 may be in the shape of a polygonal column, as long as the second terminal end portions 322 could be inserted into and be constricted by the respective one of the second cavities 15 to grip securely the at least one wire 4. In addition, each of the second gripping members 32 may have only one second slot 325, two or three second slots 325, or more than four second slots 325. However, in the case that a plurality of the second slots 325 are formed and are equally and angularly spaced apart from each other, the stress generated by the constriction of the second gripping members 32 could be effectively dispersed. However, if the second gripping member 32 is made of a resilient material, the second slots 325 may be omitted.

The fastening unit 40 secures the first gripping seat 20 and the second gripping seat 30 to the positioning seat 10. In this embodiment, the fastening unit 40 includes a plurality of first threaded members 41, each of which extends through a respective one of the first locking holes 213 and engages threadedly a respective one of the first threaded holes 14. The fastening unit 40 further includes a plurality of second threaded members 42, each of which extends through a respective one of the second locking holes 313 and engages threadedly a respective one of the second threaded holes 16.

With reference to FIGS. 1 and 2, when the wire fixing device 100 is assembled, each of the first threaded members 41 extends through the respective one of the first locking holes 213 and engages threadedly the respective one of the first threaded holes 14, and each of the second threaded members 42 also extends through the respective one of the second locking holes 313 and engages threadedly the respective one of the second threaded holes 16. As such, each of the first terminal end portion 222 is inserted into and constricted by the respective one of the first cavities 13, and each of the second terminal end portions 322 is inserted into and constricted by the respective one of the second cavities 15, thereby gripping securely the at least one wire 4 in the first through holes 226 and the second through holes 326.

Figure 4:
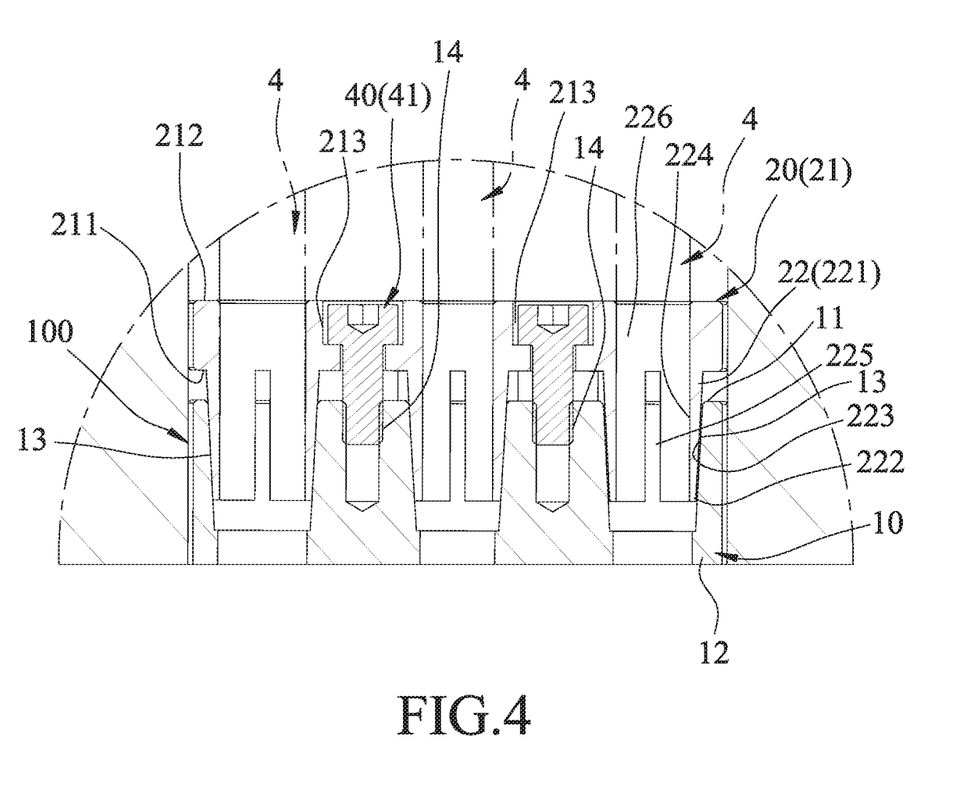
FIG. 4 is a fragmentary enlarged, sectional view illustrating a variation of the embodiment.

It should be noted that since the at least one wire 4 can be securely gripped though the constriction of the first terminal end portion 222 by the respective one of the first cavities 13, the second gripping unit 30 and the second threaded members 42 can be omitted in a variation of the embodiment (see FIG. 4).

Figure 5:
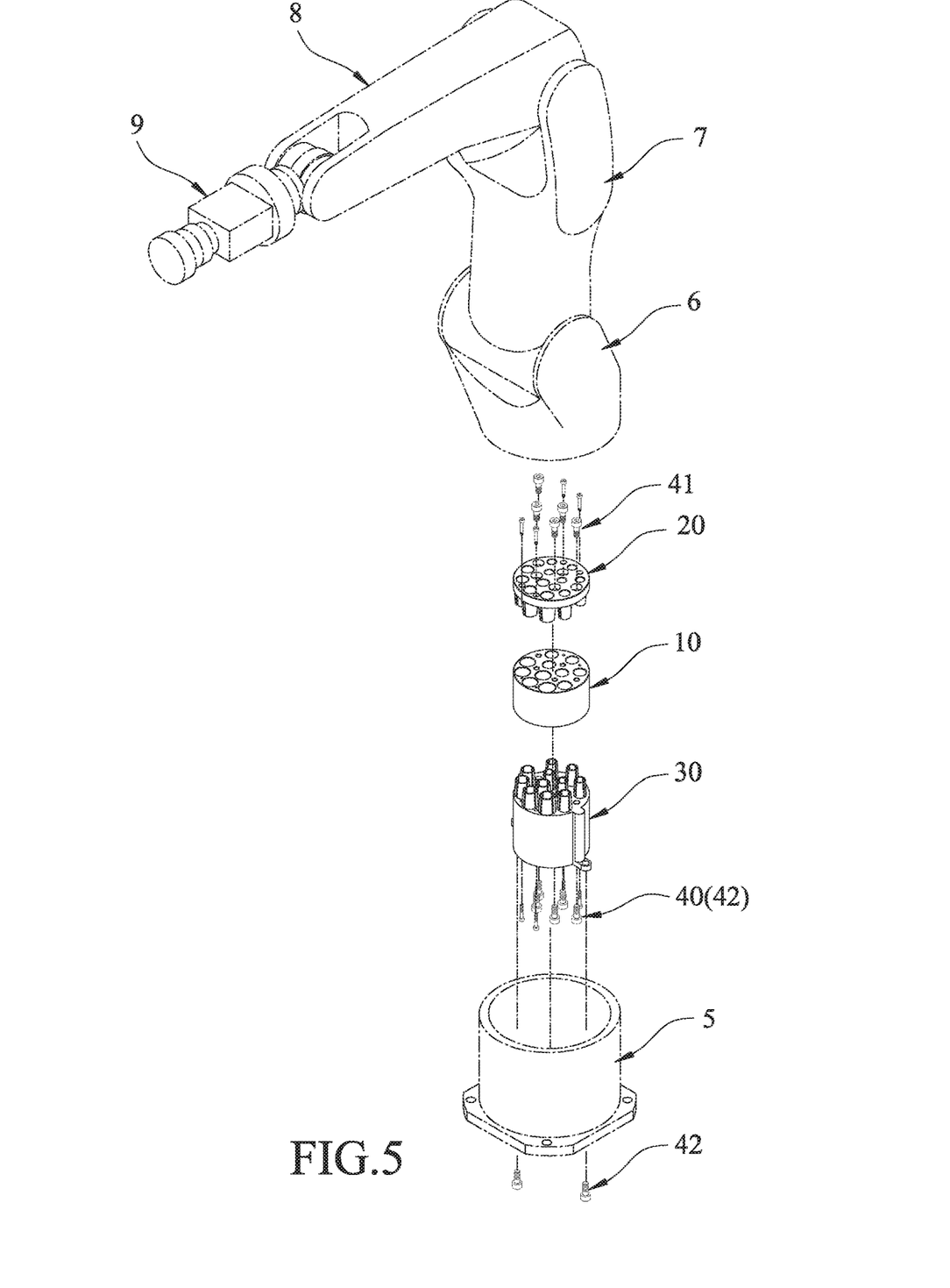
FIG. 5 is a schematic view showing the embodiment mounted in a robotic arm.

In addition, referring to FIG. 5, the embodiment of the wire fixing device 100 according to this disclosure that includes the positioning seat 10, the first gripping seat 20, the second gripping seat 30 and the fastening unit 40 is also suitable for used in a robotic arm. The robotic arm includes a base unit 5, a first rotary unit 6 that is movably (e.g., rotatably) mounted on the top of the base unit 5, a second rotary unit 7 that is movably (e.g., rotatably) mounted to the first rotary unit 6, a third rotary unit 8 that is movably (e.g., rotatably) mounted to the second rotary unit 7, and a working unit 9 that is movably (e.g., rotatably) mounted to the third rotary unit 8. The wire fixing device 100 may be deposited in one of the base unit 5, the first rotary unit 6, the second rotary unit 7, the third rotary unit 8 and the working unit 9. The wire fixing device 100 may also be deposited between two different units of the robotic arm. For example, the wire fixing device 100 is deposited between the base unit 5 and the first rotary unit 6. It is noted that the wire fixing device 100 can also be deposited between the first and second rotary units 6, 7, between the second and third rotary units 7, 8, and/or between the third rotary unit 8 and the working unit 9.

Figure 6:
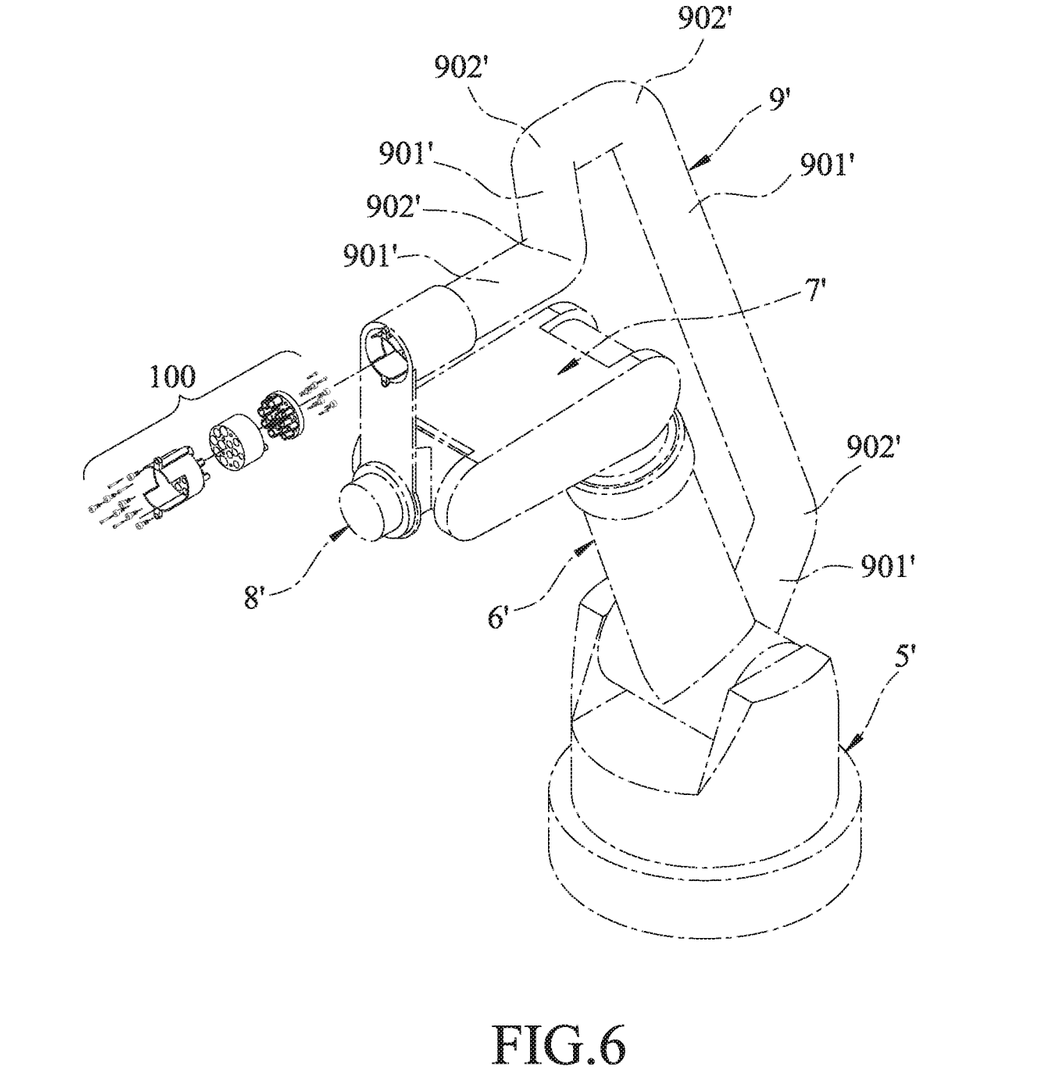
FIG. 6 is a schematic view showing the embodiment mounted in another robotic arm.

With reference to FIG. 6, the embodiment of the wire fixing device 100 according to this disclosure is suitable for used in another robotic arm that includes a base unit 5', a first rotary unit 6' that is movably (e.g., rotatably) mounted on the top of the base unit 5', a second rotary unit 7' that is movably (e.g., rotatably) mounted to the first rotary unit 6', a third rotary unit 8' that is movably (e.g., rotatably) mounted to the second rotary unit 7'. A working unit (not shown in the figure) and a flexible tube unit 9' are respectively connected to two opposite sides of the third rotary unit 8'. The flexible tube unit 9' having multiple tube segments 901' and multiple joint segments 902' connecting to two adjacent tube segments 901' is adapted for extension of the wire (e.g., for electrical or signal transmission) and/or pipe (e.g., for gas or liquid transportation) therethrough. The embodiment of the wire fixing device 100 may be deposited between the tube segment 901' and the third rotary unit 8' and/or between the tube segment 901' and the base unit 5'. Moreover, the variation of the embodiment of the wire fixing device may also be disposed in at least one of the tube segments 901'. Therefore, the wire and/or pipe in the flexible tube unit 9' can be securely gripped and positioned at multiple sites.

With the wire fixing device 100 of this disclosure, the wire 4 can be gripped securely and arranged regularly, so as to prevent the wire 4 from pulling apart during operation or repairing procedure, thereby ensuring the electrical connection thereof.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A wire fixing device adapted for gripping and positioning at least one wire in a machine, comprising:
    a positioning seat having a first end surface, a second end surface that is opposite to said first end surface in a first direction, and at least one first cavity that extends from said first end surface in the first direction toward said second end surface; and
    a first gripping seat disposed at one side of said positioning seat, and including
        a first body that has a first inner surface facing said first end surface of said positioning seat, and
        at least one first gripping member that has
            a first connection end portion connected to said first inner surface of said first body,
            a first terminal end portion being resilient and opposite to said first connection end portion in the first direction, and inserted into said at least one first cavity, and
            a first through hole extending from said first connection end portion to said first terminal end portion, and adapted for extension of the at least one wire therethrough, said first terminal end portion being constricted by said at least one first cavity to grip securely the at least one wire.

2. The wire fixing device of claim 1, wherein said at least one first gripping member further has:
    a first outer surface that extends from said first connection end portion to said first terminal end portion,
    a first inner surface that is opposite to said first outer surface and that faces said first through hole, and
    at least one first slot that extends from said first terminal end portion toward said first connection end portion, that pass through said first outer surface and said first inner surface, and that is in spatial communication with said first through hole.

3. The wire fixing device of claim 2, wherein said at least one first gripping member has two of said first slots that are angularly spaced apart by 180 degrees.

4. The wire fixing device of claim 2, wherein:
    said at least one first cavity has a diameter decreasing from said first end surface toward said second end surface; and
    said first outer surface of said at least one first gripping member has a diameter decreasing from said first connection end portion toward said first terminal end portion.

5. The wire fixing device of claim 4, wherein said at least one first cavity is frustoconical.

6. The wire fixing device of claim 4, wherein said first outer surface of said at least one first gripping member is frustoconical.

7. The wire fixing device of claim 1, further comprising a fastening unit securing said first gripping seat to said positioning seat.

8. The wire fixing device of claim 7, wherein:
said positioning seat further has at least one first threaded hole extending inwardly from said first end surface;
said first body of said first gripping seat further has a first outer surface opposite to said first inner surface, and at least one first locking hole extending from said first outer surface to said first inner surface and registered with said at least one first threaded hole; and
said fastening unit includes at least one first threaded member extending through said at least one first locking hole and engages threadedly said at least one first threaded hole.

9. The wire fixing device of claim 7, wherein:
said positioning seat further has at least one second cavity extending from said second end surface toward said first end surface in a second direction that is opposite to the first direction, and connected to said at least one first cavity;
said wire fixing device further comprises a second gripping seat that is disposed at one side of said positioning seat opposite to said first gripping seat, and that includes
a second body that has a second inner surface facing said second end surface of said positioning seat, and
at least one second gripping member that has
a second connection end portion connected to said second inner surface of said second body,
a second terminal end portion being resilient and opposite to said second connection end portion in the second direction, and insert into said at least one second cavity, and
a second through hole extending from said second connection end portion to said second terminal end portion, and adapted for extension of the at least one wire therethrough, said second terminal end portion being constricted by said at least one second cavity to grip securely the at least one wire.

10. The wire fixing device of claim 9, wherein said at least one second gripping member further has:
a second outer surface that extends from said second connection end portion to said second terminal end portion,
a second inner surface that is opposite to said second outer surface and that faces said second through hole, and
at least one second slot that extends from said second terminal end portion toward said second connection end portion, that pass through said second outer surface and said second inner surface, and that is in spatial communication with said second through hole.

11. The wire fixing device of claim 10, wherein said at least one second gripping member has four of said second slots that are angularly spacing apart by 90 degrees.

12. The wire fixing device of claim 9, wherein:
said at least one second cavity has a diameter decreasing from said second end surface toward said first end surface; and
said second outer surface of said at least one second gripping member has a diameter decreasing from said second connection end portion toward said second terminal end portion.

13. The wire fixing device of claim 10, wherein said at least one second cavity is fructoconical.

14. The wire fixing device of claim 10, wherein said second outer surface of said at least one second gripping member is frustoconical.

15. The wire fixing device of claim 9, wherein:
said positioning seat further has at least one second threaded hole extending inwardly from said second end surface;
said second body of said second gripping seat further has a second outer surface opposite to said second inner surface, and at least one second locking hole extending from said second outer surface to said second inner surface and registered with said at least one second threaded hole; and
said fastening seat includes at least one second threaded member extending through said at least one second locking hole and engages threadedly said at least one second threaded hole.

* * * * *